United States Patent

Carduner et al.

[11] Patent Number: 5,091,647
[45] Date of Patent: Feb. 25, 1992

[54] METHOD AND APPARATUS FOR MEASURING THE THICKNESS OF A LAYER ON A SUBSTRATE

[75] Inventors: Keith R. Carduner; Roscoe O. Carter, III, both of Dearborn; Dennis Schuetzle, West Bloomfield; Michael J. Decello, Dearborn Heights, all of Mich.

[73] Assignee: Ford Motor Company, Dearborn, Mich.

[21] Appl. No.: 632,557

[22] Filed: Dec. 24, 1990

[51] Int. Cl.⁵ .................. G01N 21/17; G01N 21/35
[52] U.S. Cl. .................................. 250/341; 250/339; 250/340
[58] Field of Search ................ 250/341, 340, 339

[56] References Cited

U.S. PATENT DOCUMENTS

| | | | |
|---|---|---|---|
| 3,426,201 | 2/1969 | Hilton et al. | 250/338.1 |
| 3,437,811 | 4/1969 | Willis et al. | 250/338.1 |
| 3,448,268 | 6/1969 | Proctor | 250/353 |
| 3,661,462 | 5/1972 | Natens | 356/51 |
| 3,825,755 | 7/1974 | Ruskin | 250/339 |
| 3,973,122 | 8/1976 | Goldberg | 250/338.1 |
| 3,994,586 | 11/1976 | Sharkins et al. | 356/73 |
| 4,015,127 | 3/1977 | Sharkins | 250/341 |
| 4,129,781 | 12/1978 | Doyle | 250/341 |
| 4,207,467 | 6/1980 | Doyle | 250/338.1 |
| 4,243,882 | 6/1981 | Yasujima et al. | 250/339 |
| 4,320,967 | 3/1982 | Edgar | 356/51 |
| 4,421,983 | 12/1983 | Fogle et al. | 250/339 |
| 4,429,225 | 1/1984 | Fumoto et al. | 250/353 |
| 4,490,612 | 12/1984 | Törmälä | 250/339 |
| 4,510,389 | 4/1985 | Fumoto | 250/339 |
| 4,549,075 | 10/1985 | Terasaka et al. | 380/25 |
| 4,625,114 | 11/1986 | Bosacchi et al. | 250/341 |
| 4,631,408 | 12/1986 | Zelmanovic et al. | 250/339 |
| 4,652,742 | 3/1987 | Wauer et al. | 250/223 R |
| 4,745,291 | 5/1988 | Niiya | 250/560 |
| 4,885,709 | 12/1989 | Edgar et al. | 364/563 |
| 4,943,721 | 7/1990 | Vidrine, Jr. | 250/308 |

Primary Examiner—Constantine Hannaher
Attorney, Agent, or Firm—Damian Porcari; Clifford L. Sadler

[57] ABSTRACT

A method and an apparatus for simultaneously measuring each constituent film in a multi-layer coating. Near Infrared Reflectance (NIR) measurements are taken at the peak and reference wavelength for a series of calibration samples. Based on these measurements, a relationship is established between the film NIR and thickness. A measuring NIR spectrometer is supplied with the relationship and a target sample is irradiated with near infrared radiation at each peak and reference wavelength. The measuring spectrometer measures the amount of NIR and computes the individual film thicknesses using the relationship supplied to it. Individual film thicknesses can be visually displayed, and/or directed to the film applying apparatus. If the thickness of an individual film layer deviates from a predetermined valve, the film applying apparatus is manipulated to apply the desired thickness of film.

21 Claims, 5 Drawing Sheets

METHOD AND APPARATUS FOR MEASURING THE THICKNESS OF A LAYER ON A SUBSTRATE

FIELD OF THE INVENTION

The present invention relates to the nondestructive measuring of a multi-layer polymer coating of a substrate using near infrared spectroscopy. The substrate may be any near infrared reflective or non-reflective substrate including metal and plastic.

BACKGROUND OF THE INVENTION

Modern automotive finishes are generally composed of one or more primer layers and one or more top coat layers. The top coat layers often consist of a layer of base coat and a layer of clear coat. Each layer forms a distinct and measurable film. The quality of a painted part is generally indicated by the smoothness and uniformity of the finish and is commonly referred to as gloss. The level or amount of gloss on a finished part, referred to as its gloss index, requires a careful application of a precise amount of primer, base and clear coat. The minimum application thickness of base coat sufficient to mask the primer coat results in a higher gloss index than that achieved with a thicker base coat. The higher gloss index for a thin base coat has the advantage of providing an enhanced surface appearance and a cost savings in material for the finished article. Careful monitoring of the thickness of each layer of paint is required to achieve a high quality product.

2. Description of the Related Art

Previous methods of measuring a coating's thickness include various destructive means. A sample of the coated surface was sanded until the each layer was selectively removed. The thickness or each layer could then be measured.

Various nondestructive means for measuring a coating thickness also exist. Magnetic eddy current meters are capable of measuring the total thickness of a coating when applied to a ferrometallic substrate; but eddy current meters are incapable of measuring the individual thickness of a multi-layer coating Also, they cannot measure the thickness of a coating on a plastic or non-ferrometallic substrate.

Infrared absorption has been used to measure the thickness of water-based fillers on wood subsfrate as taught in U.S. Pat. No. 4,421,983 issued Dec. 20, 1983 to Fogle et al. These devices use the measured thickness of the filler to adjust the filler applicator. The amount of filler is controlled to maintain the coating weight or thickness within optimumal limits. Fogle et al. measures the thickness of each film sequentially. It does not measure the individual film thickness of an article having multiple layers previously applied.

Other devices use infrared radiation to measure the thickness of a coating on a metallic substrate. These devices use a black body radiator emitting beams of infrared radiation onto a coating applied to an infrared absorbing substrate. The infrared radiation emitted from both the coating and the substrate art compared to the radiation from the black body radiator and the total thickness of the coating is determined. These infrare devices require careful control of environmental factors especially temperature. The infrared radiation tends to warm the substrate, affecting the emitted radiation. These devices cannot measure the individual thickness of a multi-layer coating and they cannot measure the thickness of a coating on a nonmetallic substrate such as plastic because the nonmetallic substrate does not absorb sufficient infrared radiation.

Infrared absorption has been used to measure the thickness of a coating when applied to an infrared transparent film substrate. The infrared radiation penetrates both the coating and the film substrate and the amount of infrared absorption of the coating and film is measured opposite the infrared source. The film substrate must be relatively thin and made of a material which does not absorb or reflect infrared radiation. Such film substrates are generally not suitable for automotive painted structures such as fenders and doors. Such a method was taught in U.S. Pat. No. 4,631,408 issued Dec. 23, 1986 to Zelmanovic et al. Zelmanovic et al. teaches the use of infrared absorbance to measure the thickness and orientation of a flexible polymer such as polyethelene and nylon for use in bags. Zelmanovic et al. teaches passing an infrared beam of light through a multi-layer film and using the absorbance to calculate the thickness of each layer. When the film does not transmit sufficient light, absorbance can be measured by the reflected light. Zelmanovic et al. does not teach thickness measurement for solid films on rigid substrates, nor does Zelmanovic et al. teach a parabolic collecting mirror for the reflected light source.

It is an object of this invention to simultaneously measure the individual thicknesses of a multi-layer film applied to a substrate using near infrared radiation. The substrate is non-transparent to near infrared radiation and additionally maybe a non-reflective, nonmetallic substrate such as plastic. The film layers specifically include automotive paints such as base coat and clear coat layers.

It is another object of this invention to use the measured thickness of a film coating to control the application of film on a substrate.

SUMMARY OF THE INVENTION

In accomplishing these and other objects of the present invention, there is provided a method and an apparatus for measuring the thickness of two or more film layers on a non-transparent substrate. A near infrared radiation source emits near infrared radiation on the film layers. A near infrared radiation detector measures the amount of near infrared radiation reflected from the film layers. A calculating means determines the thickness of each film layer by comparing the measured reflectance to one or more predetermined values or by using a predetermined equation.

The invention permits the simultaneous measurement of each constituent film layer in a multi-layer coating. Near infrared peak and reference absorbance wavelengths are identified for each layer of film. Near Infrared Reflectance (NIR) measurements are taken at the peak and reference wavelengths for a series of calibration samples having a varying thickness of one film layer and a constant thickness of the other film layers. Based on these measurements, a relationship is established between a film's NIR and its thickness. This relationship is determined using a reiterative regression analysis process. The greater the number of calibration samples, the greater the precision in determining the relationship.

A measuring NIR spectrometer is supplied with the absorbance versus thickness relationship for each combination of films and for each type of substrate it is used with. A target sample being measured is irradiated with near infrared radiation at the peak and reference wavelength and the NIR of the target sample measured. The measuring spectrometer measures the amount of NIR and computes the individual film thicknesses using the relationship supplied to it.

Individual film thicknesses can be visually displayed, and/or directed to the film applying apparatus. If the thickness of an individual film layer deviates from a predetermined value, the film applying apparatus may be manipulated to apply the desired thickness for the film layer.

It is a feature of this invention to use NIR in a nondestructive method of measuring the individual film thicknesses of a multi-layer paint coating over a near infrared reflective or non-reflective substrate.

It is another feature of the present invention to integrate this method of measuring the individual film thickness of a multi-layer paint process to interactively calibrate the application of paint to maintain a uniform paint thickness for each film layer.

Brief Description of the Drawings

The earlier mentioned objects and advantages as well as others will become apparent to those skilled in the film measurement art after reading the following description with reference to the accompanying drawings in which.

DETAILED DESCRIPTION OF THE PREFERRED EMBODIMENTS

Figure 1:
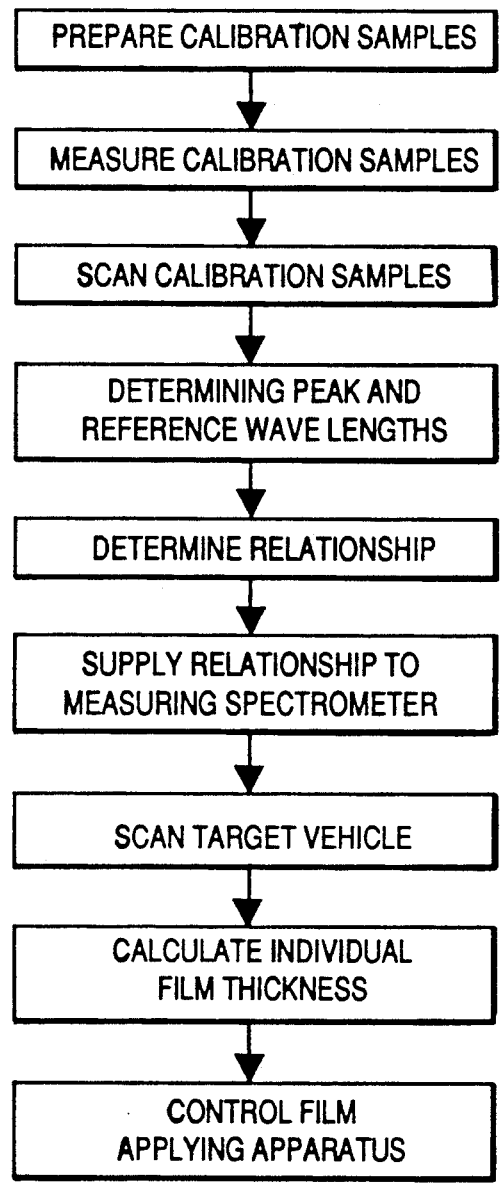
FIG. 1 is flow chart of a Process for painting a vehicle.

A preferred method of calibrating, measuring and painting a vehicle is shown in FIG. 1. A series of calibration samples are prepared. The calibration samples are prepared on the same type of substrate as the painted vehicle part. The substrate may be either near infrared reflective such as metal or may be non-reflective such as plastic. The substrate is non-transparent to near infrared radiation (i.e., near infrared radiation cannot pass through the substrate). Modern vehicles have both metal and nonmetal painted parts, therefore the calibration samples include both metal and nonmetal substrates. The calibration samples are measured to determine the thickness of each film layer as will be more fully described.

The calibration samples are scanned in the near infrared region by a calibrating spectrometer. The peak absorbance wavelength is determined for each film layer. A reference absorbance wavelength is also determined for each peak wavelength (as more fully described below). An example of a suitable near infrared spectrometer is the model Infralyzer 500, manufactured by Bran Luebbe Analyzing Technologies, Elmsford, N.Y. A computer records the absorption at each scanned wavelength for each calibration sample. The computer uses this data to determine the peak and reference wavelengths of near infrared radiation for each film layer. Subtracting the absorbance at the reference wavelength from the absorbance at the peak wavelength, a relative absorbance of each film layer is determined. Using mathematical regression analysis as will be more fully described below, the computer determines a relationship between film thickness and relative absorption.

The relationship between relative absorbance and film thickness is provided to a measuring spectrometer. The measuring spectrometer can be the same as the calibrating spectrometer, or (as will be more fully described below) it can be made of a simpler design to only scan the peak and reference wavelengths of each film layer. A fiber optic cable is attached to the measuring spectrometer. The fiber optic cable terminates into a probe which is brought in contact, or near contact, with the target vehicle. The target vehicle is scanned for the absorbance at the peak and reference wavelengths for each film layer, and a measurement is made of the relative absorbance. A computer or Central Processing Unit (CPU) within the measuring spectrometer computes the individual thickness of each film coating on the target vehicle using the stored relationship and the measured relative absorbance. The individual film thickness can be displayed and/or directed to the paint sprayers to control the amount and thickness of each layer of paint applied.

According to the preferred method of FIG. 1, the output of the measuring spectrometer is provided to the film applying apparatus. If the thickness of any or all of the films deviates from the desired thickness, the film applying apparatus is adjusted to maintain the desired thickness.

The NIR measuring process disclosed herein is capable of measuring the individual film thickness of two (2) or more layers of paint on either a metallic or nonmetallic substrate. Described in FIGS. 2-7 are an apparatus and method for measuring the individual film thickness of a two (2) layer Paint consisting of a base layer called a base coat, and a clear layer atop the base coat called a clear coat.

The spectral region used for NIR extends from 750 to 2,500 nm. Over this range of wavelengths of radiation, the absorbance of radiation by molecular vibrations tends to be weak. As a consequence, near infrared radiation can deeply penetrate into opaque films. The shorter wavelengths of near infrared radiation are readily scattered when passing through an opaque film. For the case of a paint film on a metallic or nonmetallic substrate, the near infrared radiation is "back scattered". This back scattered radiation is called diffuse reflectance. It is radiated isotropically from the substrate and is thus distinguished from specularly reflected radiation from which the angle of incidence equals the angle of reflection. Near infrared radiation was chosen because of its generally weaker absorbance by paint coatings and the increased amount of radiation isotropically reflected as compared with prior mid-infrared techniques. Near infrared radiation can penetrate thick coatings and its reflectance from opaque substrates such as steel or plastic can be linearly related to the individual thickness of each film.

Figure 2:
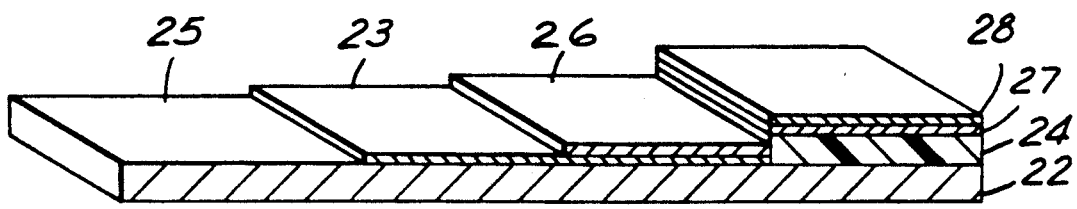
FIGS. 2 is a profile sectional view of a calibration sample painted with the base coat and clear coat layer. The base and clear coat layer thicknesses are exaggerated for clarity.

Near infrared spectrometry requires a calibration sample for each film and substrate which will be measured. The reflectance of a coating on steel differs from the reflectance of a coating on plastic, therefore, the process requires a sample of each substrate used in the NIR calibration. To easily prepare a calibration sample for both metal and plastic, calibration sample having both a metal portion 22 and plastic portion 24 is used as shown in FIGS. 2. Metal portion 22 has the same composition as the metal used in the target vehicle, and plastic portion 24 has the same composition of the plastic used.

Calibration sample is sprayed with a layer of base coat paint. A layer of base coat 25 is applied to metal substrate 22 and a layer of base coat 27 is applied to plastic substrate 24. An area 23 on layer 25 is masked and a layer of clear coat applied atop the base coat layer. Clear coat layer 26 overlies base coat layer 25 and clear coat layer 28 overlies base coat layer 27. The thickness of base coat/clear coat layers 25, 26 can be presumed to be equal to the base coat/clear coat layers 27, 28. A number of calibration samples are prepared. It is generally desirable to prepare at least two series of calibration samples. Each series has a fixed medium thickness of one coating while the thickness of the other coating is varied from very thin to very thick. It is important to note that each calibration sample is coated with both a layer of base coat and clear coat.

Using a magnetic eddy current measuring device such as of the type sold by Fisher Technology, Inc., Windsor, Conn., the thickness of the base coat 25 and the combined base coat and clear coat 25, 26 can be easily measured. By subtracting the thickness of the base coat 25 from the combined thickness of the base coat/clear coat 25, 26, the thickness of clear coat 26 can be calculated. Three or more layers can be determined using the same technique of masking and measuring the various layers of films.

The calibration samples are placed in the calibration spectrometer and scanned between the wavelengths from 700 to 2,500 nm. The calibration spectrometer measures the absorbance of the combined base coat and clear coat as NIR. Both metal substrate 22 and plastic substrate 24 must be separately measured for each calibration sample 2. A general Purpose computer records the measured absorbance at each measured wavelength along with the base coat and clear coat thickness of each calibration sample 2. For purposes of describing the invention, only the measurements taken from plastic substrate 24 will be illustrated. The procedures for determining the base coat and clear coat thickness applied to metal substrate 22 are essentially identical.

Figure 3A:
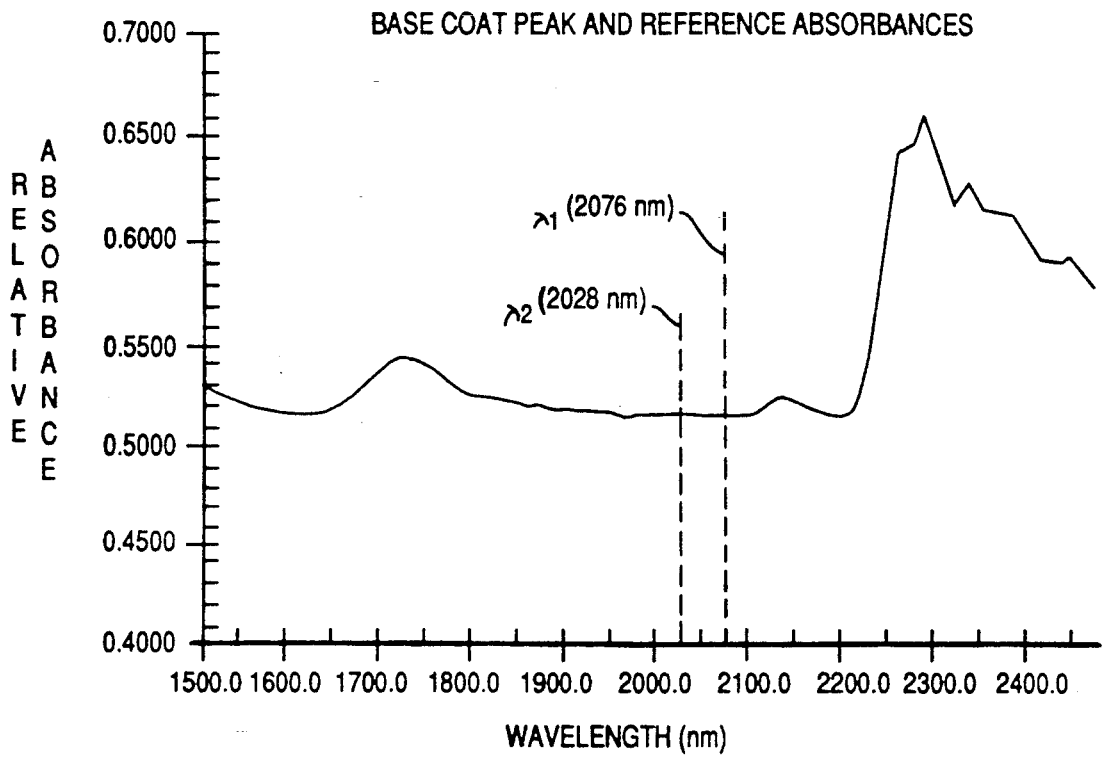
FIGS. 3a and 3b are graphs of the wavelength versus the absorbance for base coat and clear coat layers applied to a plastic substrate.
Figure 3B:
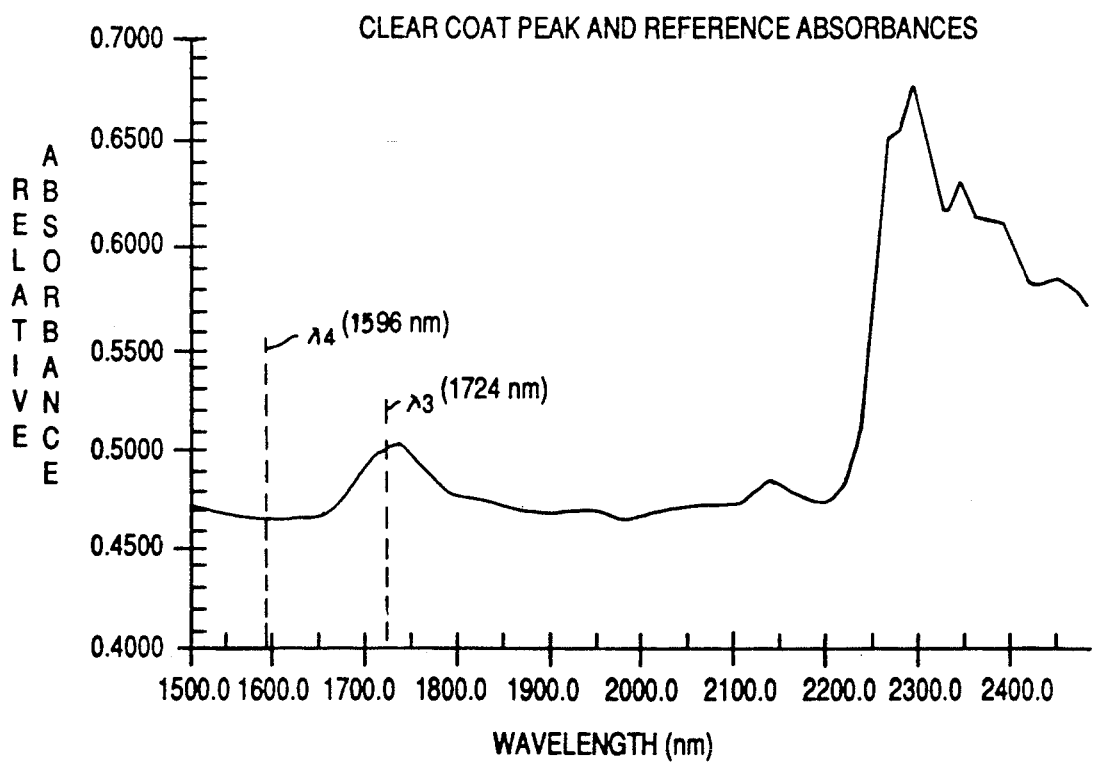

Two graphs of absorbance versus wavelength are shown in FIGS. 3a and 3b. FIG. 3a represents the measured absorbance of a calibration sample made with pigmented metal oxide acrylic melamine, manufactured by Du Pont Automotive Finishes, Philadelphia, Pa. and having the thickest base coat. FIG. 3b represents the absorbance of a calibration sample made with clear acrylic melamine, manufactured by Du Pont Automotive Finishes, Philadelphia, Pa. and having the thickest clear coat. Two (2) wavelengths are selected for each film layer. One wavelength corresponds to the maximum peak absorbance for that film layer, and a second wavelength is selected in the vicinity of the peak wavelength which has a low absorbance. The wavelength showing a peak absorbance shall be used as a peak wavelength and the wavelength having a low absorbance will be used as a reference absorbance. The difference between the peak absorbance and the reference absorbance will be referred to as the relative absorbance and represented as $\Delta$ Abs.

The relative absorbance for each film layer will be calculated based on the difference between the peak absorbance and the reference absorbance. Because all measurements will be based on the relative absorbance and not absolute absorbance, environmental factors such as the absorbance of the plastic or metal substrate and the near infrared emission of the substrate due to temperature are assumed to affect peak and relative absorbance equally and are thereby negated. By analyzing a number of samples having a varying thickness of base coat, it can be analytically determined that the base coat has a maximum peak absorbance at the wave length 2076 nm, designated $\lambda_1$ in FIG. 3a. The reference wavelength 2028 nm is designated $\lambda_2$ is in the vicinity of $\lambda_1$ and provides an area of relatively low absorbance for the base coat. The scale of FIG. 3a makes it visually difficult to ascertain the peak and reference wavelengths for the base coat layer, but they are easily analytically identifiable when mathematically analyzing a number of calibration samples using the above identified near infrared spectrometer. The difference in absorbance between $\lambda_1$ and $\lambda_2$ will be the relative absorbance of the base coat and described as $\Delta$ Abs $\lambda_1-\lambda_2$.

FIG. 3b shows a maximum peak absorbance of clear coat at the wavelength 1724 nm, and is designated $\lambda_3$. The wavelength 1596 nm, designated $\lambda_4$, is in the vicinity of $\lambda_3$ and provides an area of low absorbance for the clear coat and will be used as the reference wavelength for the clear coat. The difference in absorbance between $\lambda_3$ and $\lambda_4$ will be the relative absorbance of the base coat and described as $\Delta$ Abs $\lambda_3-\lambda_4$. All subsequent calculations will be performed using only the absorbance of the calibration samples at these four wavelengths.

Below are tables that list the absorbance for calibration samples having various thicknesses of base and clear coat on a plastic substrate. Table A lists the absorbances at $\lambda_1$ and $\lambda_2$ for calibration samples having a constant thickness of clear coat and varying thicknesses of base coat. The peak absorbance for the base coat is $\lambda_1$ and the reference wavelength is $\lambda_2$. The formula $\Delta Abs\lambda_1-\lambda_2$ represents the difference in absorbance between the wavelengths $\lambda_1$ and $\lambda_2$. Table B lists the absorbance for calibration samples having a constant thickness of base coat and a varying thickness of clear coat. The peak absorbance for the clear coat is $\lambda_3$ and the reference wavelength is $\lambda_4$. The formula $\Delta Abs\lambda_3-\lambda_4$ represents the difference in absorbance between the wavelengths $\lambda_3$ and $\lambda_4$.

TABLE A

| Base Coat Thickness* | Abs(2076) | Abs(2028) | Abs(diff) |
|---|---|---|---|
| .45 | .494691 | .494250 | −.000441 |
| .70 | .466475 | .466079 | −.000396 |
| 1.10 | .465218 | .464851 | −.000367 |
| 1.45 | .467874 | .464851 | −.000250 |
| 1.75 | .476282 | .476067 | −.000215 |
| 2.15 | .483939 | .483766 | −.000173 |
| 2.35 | .493335 | .493195 | −.000140 |
| 2.80 | .516612 | .516586 | −.000026 |

*1/1000 inch (Mils)

TABLE B

| Clear Coat Thickness* | Abs(1724) | Abs(1596) | Abs(diff) |
| --- | --- | --- | --- |
| .35 | .4628 | .4557 | .0071 |
| .50 | .4667 | .4573 | .0094 |
| .90 | .4758 | .4602 | .0156 |
| 1.20 | .4803 | .4602 | .0201 |
| 1.40 | .4857 | .4613 | .0244 |
| 1.75 | .4917 | .4621 | .0296 |
| 2.00 | .5020 | .4658 | .0362 |
| 2.45 | .5032 | .4632 | .0400 |

*1/1000 inch (Mils)

A portion of the near infrared radiation directed to the calibration samples is either absorbed by the substrate or scattered in a way in which it is not measured. This amount of radiation is independent of the thickness of the coating, but must be accounted for in determining the relationship between film thickness and absorbance and can be described as a numerical environmental constant. This environmental constant can be determined by plotting the data in Tables A and B and extrapolating to a zero thickness of each film coating.

Figure 4:
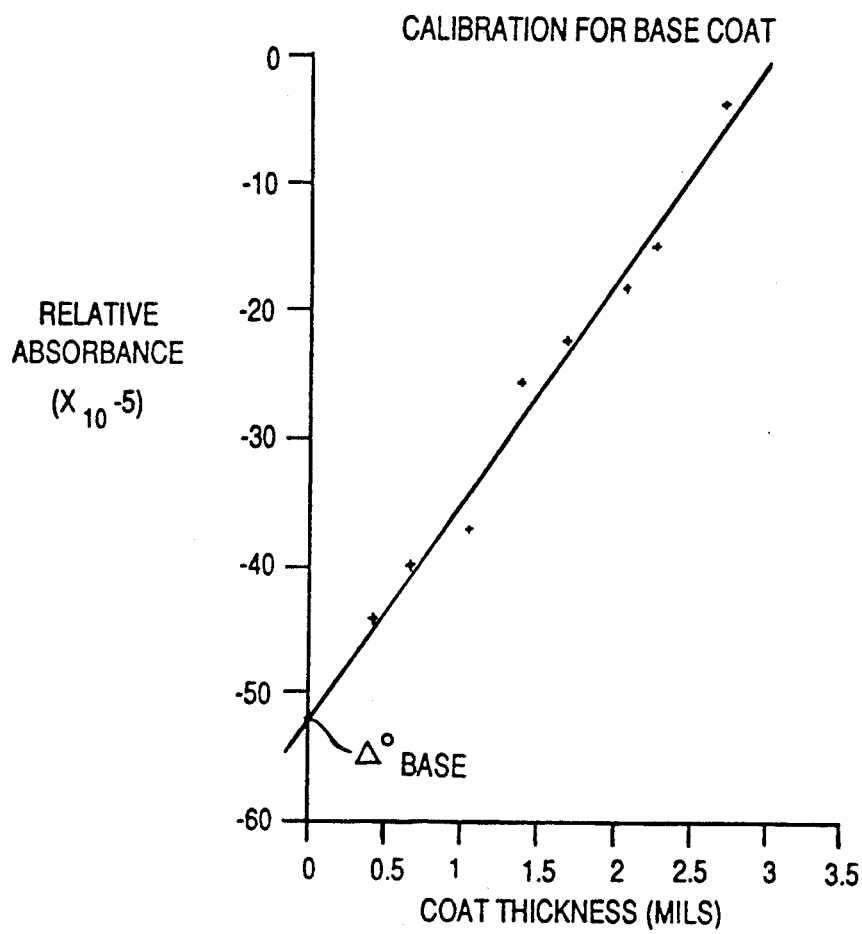
FIG. 4 is a graph of the film thickness versus relative absorbance for the base coat calibration.
Figure 5:
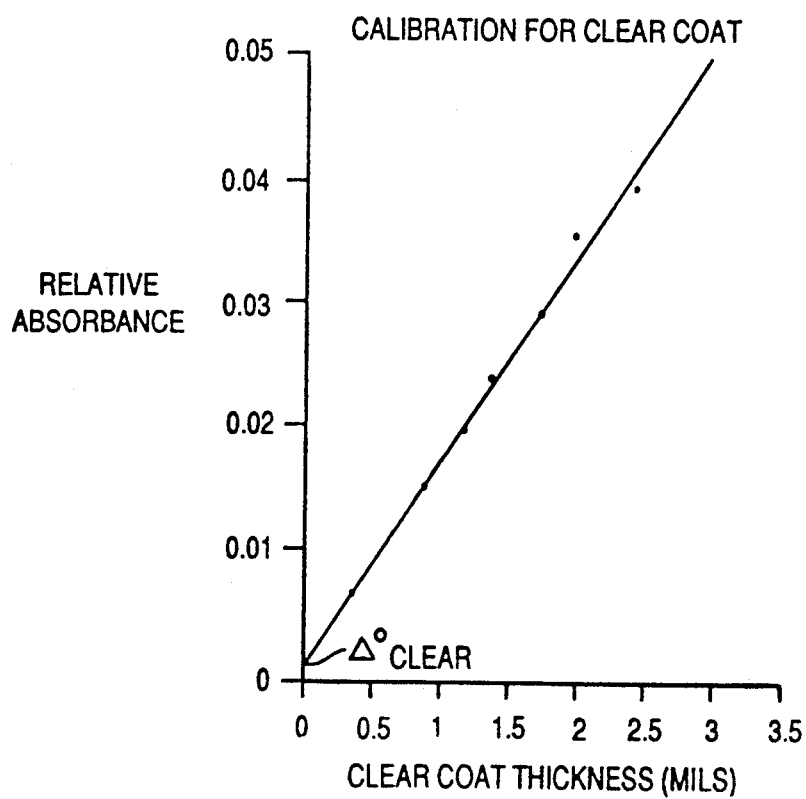
FIG. 5 is a graph of the film thickness versus relative absorbance for the clear coat calibration.

The graphs of film thickness versus $\Delta$ Abs are shown in FIGS. 4 and 5. FIG. 4 graphically illustrates the data contained in Table A whereas FIG. 5 graphically illustrates the data contained in Table B. Using linear regression, a best fit line is plotted to approximate the slope of the data points. Turning now to FIG. 4, the Y axis intercept labeled $\Delta^{\circ}_{base}$ represents the extrapolated $\Delta$ Abs for a hypothetical sample having a zero thickness of base coat. The valve samples are measured with a minimum base coat thickness and clear coat thickness. FIG. 5 shows a Y axis intercept labeled $\Delta^{\circ}_{clear}$ representing the extrapolated $\Delta$ Abs for a hypothetical sample having a zero thickness of clear coat. The values $C_{clear}$ and $C_{base}$ are calculated as shown below and are correction constants to account for near infrared radiation absorbed by the substrate or reflected beyond the detection of the spectrometer:

$$C_{base} = \Delta^{\circ}_{base}(R_{base}\lambda_1 - \lambda_2) \qquad \text{Equation 1}$$

$$C_{Clear} = \Delta^{\circ}_{clear}(R_{clear}\lambda_3 - \lambda_4) \qquad \text{Equation 2}$$

A regression equation is capable of approximating the linear relationship between the relative absorbance for each wavelength and an individual film coating's thickness. The mathematical regression analysis for determining film thickness and measured relative absorbance as well as the mathematical regression analysis for determining film thickness from measured relative absorbance is taught and described in U.S. Pat. No. 4,631,408, issued Dec. 23, 1986 to Zelmanovic et al. and are incorporated herein by reference. For the base coat, Equation 3 below relates the $\Delta$ Abs to the base coat thickness:

$$\text{Base coat thickness} = C_{base} + (R_{base}\lambda_1 - \lambda_2)(\Delta Abs\lambda_1 - \lambda_2) \qquad \text{Equation 3}$$

Regression coefficients $R_{base}\lambda_1 - \lambda_2$ and $R_{base}\lambda_3 - \lambda_4$ are the proportionality factors used in the regression analysis.

Equation 4 relates the the $\Delta$ Abs to the clear coat thickness.

$$\text{Clear coat thickness} = C_{clear} + (R_{clear}\lambda_3 - \lambda_4)(\Delta Abs\lambda_3 - [_4) \qquad \text{Equation 4}$$

By combining Equations 3 and 4, one can determine the combined base and clear coat thickness of a coating using only the four (4) absorbance wavelengths $\lambda_1$ through $\lambda_4$. --Equations 3 and 4 may be generalized as follows:

$$\text{Paint layer thickness} = C + \sum_{i=1}^{n} R_i \Delta Abs_i$$

where [i and ]
  n = the total number of paint layers i
  C = a reflectance constant
  $R_1$ = a regression constant for each paint layer i
  $\Delta Abs_1$ = the relative absorbance of each paint layer i.

The preceding equations assume a linear relationship between a film layer's thickness and the $\Delta$ Abs between a peak and a reference wavelength. Using the techniques and equations described above, the individual thickness for three (3) or more layers can be measured by simply adding $\Delta$ Abs for the peak and reference wavelength of each additional layer.

Using standard regression analysis techniques as described in "Chemometrics:, M. H. Sharaf, D. L. Illman, B. R. Kowalski, *John Wiley and Sons*, New York (1986), or using commercially available computer software programs, for example "Idas", Bran, and Luebbe, *Analyzing Technologies*, Elmsford, N.Y., one can determine the regression coefficients $R_{base}$ $\lambda_1 - \lambda_2$ and $R_{clear}$ $\lambda_3 - \lambda_4$, for Equations 3 and 4.

Using the theoretical relationship between coating thickness and $\Delta$ Abs from Equation (3) and the values from Table A, the following Equation (5) is the numerical linear relationship between $\Delta$ Abs and the base coat thickness for the base coat, clear coat and plastic substrate described above:

$$\text{Base Coat Thickness} = 3.0 + (5,801)(\Delta Abs\lambda_1 - \lambda_2) \qquad \text{Equation 5}$$

Using the relationship from Equation (4) and the values from Table B, the following Equation (6) is the numerical linear relationship between $\Delta$ Abs and the clear coat thickness (in mils) for the base coat, clear coat and plastic substrate described above.

$$\text{Clear Coat Thickness} = -0.09 + (61.88)(\Delta Abs\lambda_3 - \lambda_4) \qquad \text{Equation 6}$$

A similar process of determining the relationship between the base coat and clear coat thickness to the relative absorbance at specific wavelengths can be carried out for the painted metal substrate 22.

Figure 6:
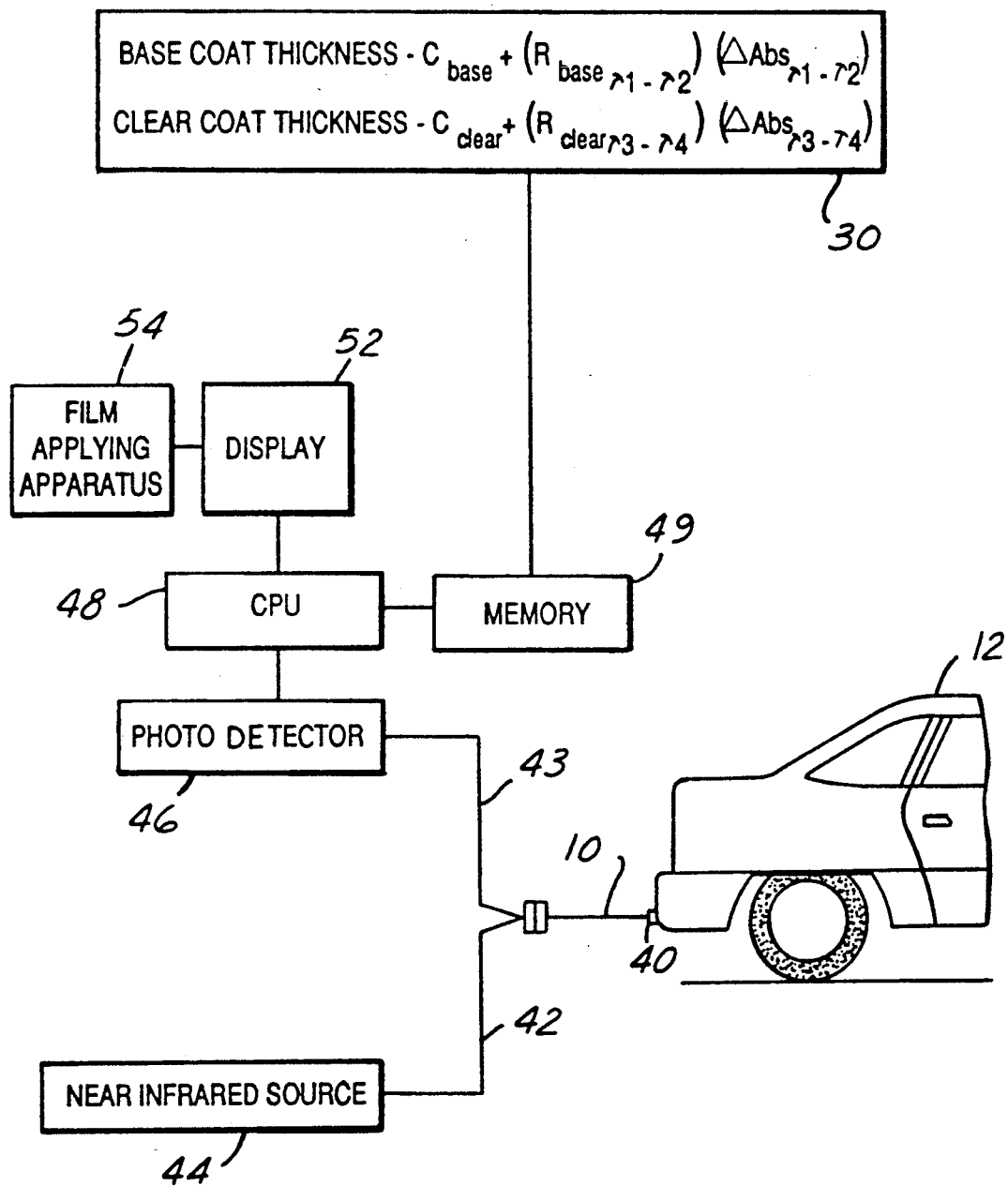
FIG. 6 is a functional schematic of the measuring spectrometer.

Turning now to FIG. 6, the calibrated linear relationship 30 described in Equations (5) and (6) are supplied to a memory storage means 49 in measuring spectrometer 8. The measuring spectrometer 8 is preferably of the portable type. Measuring spectrometer 8 is designed to be placed in the vicinity of the target vehicle to be measured.

The fiber optic cable 10 transmits the emitted and reflected near infrared radiation to spectrometer 8. Probe 40 attaches to cable 10 and is placed on the substrate to be measured. To obtain precise measurements of film thickness, probe 40 should be spaced a fixed distance from the painted substrate equal to that used in the calibration process. A soft, nonmarring spacer is attached to the end of probe 40 (not shown) and contacts the target vehicle without harming it and spaces probe 40 a fixed distance from the substrate. Probe 40 can be spaced a fixed distance from the painted substrate by a variety of non-contact means. These non-contact means are useful when using the present invention to measure film thickness on a moving sample, or when the sample has not fully cured.

Fiber optic cable 10 is bifurcated into two leads. A source lead 42 communicates probe 40 with a near infrared radiation source 44. Near infrared radiation source 44 is capable of emitting the four (4) desired wavelengths $\lambda_1$, $\lambda_2$, $\lambda_3$ and $\lambda_4$. Absorbance lead 43 connects probe 40 with photo detector 46. Photo detector 46 is designed to measure the amount of NIR in the wavelengths $\lambda_1$, $\lambda_2$, $\lambda_3$ and $\lambda_4$.

A wide variety of commercially available near infrared photo detectors exist. A variety of techniques exist in the manufacture of near infrared radiation source 44 and photo detector 46. One example of a near infrared radiation source 44 is a polychromatic source which can supply a wide band of near infrared radiation and four (4) filters. Each filter passes radiation having one of the desired wavelengths; $\lambda_1$, $\lambda_2$, $\lambda_3$ and $\lambda_4$ is a monochromator. An alternative method and apparatus is to use four monochromic sources to simultaneously emit the four desired wavelengths. In the case of simultaneous transmission of the desired wavelengths, photo detector 46 must be comprised of four separate photo detectors. One photo detector would be required for each desired wavelength of NIR. The simultaneous emission and measurement of the desired wavelengths increases the speed with which a measurement can be made.

The output of photo detector 46 corresponds to the absorbance of the base coat and clear coat at the four desired wavelengths and supplies the variables Abs $\lambda_1$, Abs $\lambda_2$, Abs $\lambda_3$, and Abs $\lambda_4$ to a CPU 48. CPU 48 acts as a comparator and uses the calibrated linear relationship 30 stored in a memory means 49 and the measured absorbance Abs $\lambda_1$ through Abs $\lambda_4$ to determine the film thickness of the base coat and clear coat and the combined thickness of both layers. The difference between Abs $\lambda_1$ and Abs $\lambda_2$ corresponds to $\Delta Abs \lambda_1 - \lambda_2$ and the difference between $Abs \lambda_3$ and $Abs \lambda_4$ corresponds to $\Delta Abs \lambda_3 - \lambda_4$. CPU 48 substitutes the values for $\Delta Abs \lambda_1 - \lambda_2$ and $\Delta Abs \lambda_3 - \lambda_4$ into equations 5-6 and calculates the base coat, clear coat and combined thicknesses. These results are displayed numerically on display 52.

Figure 7:
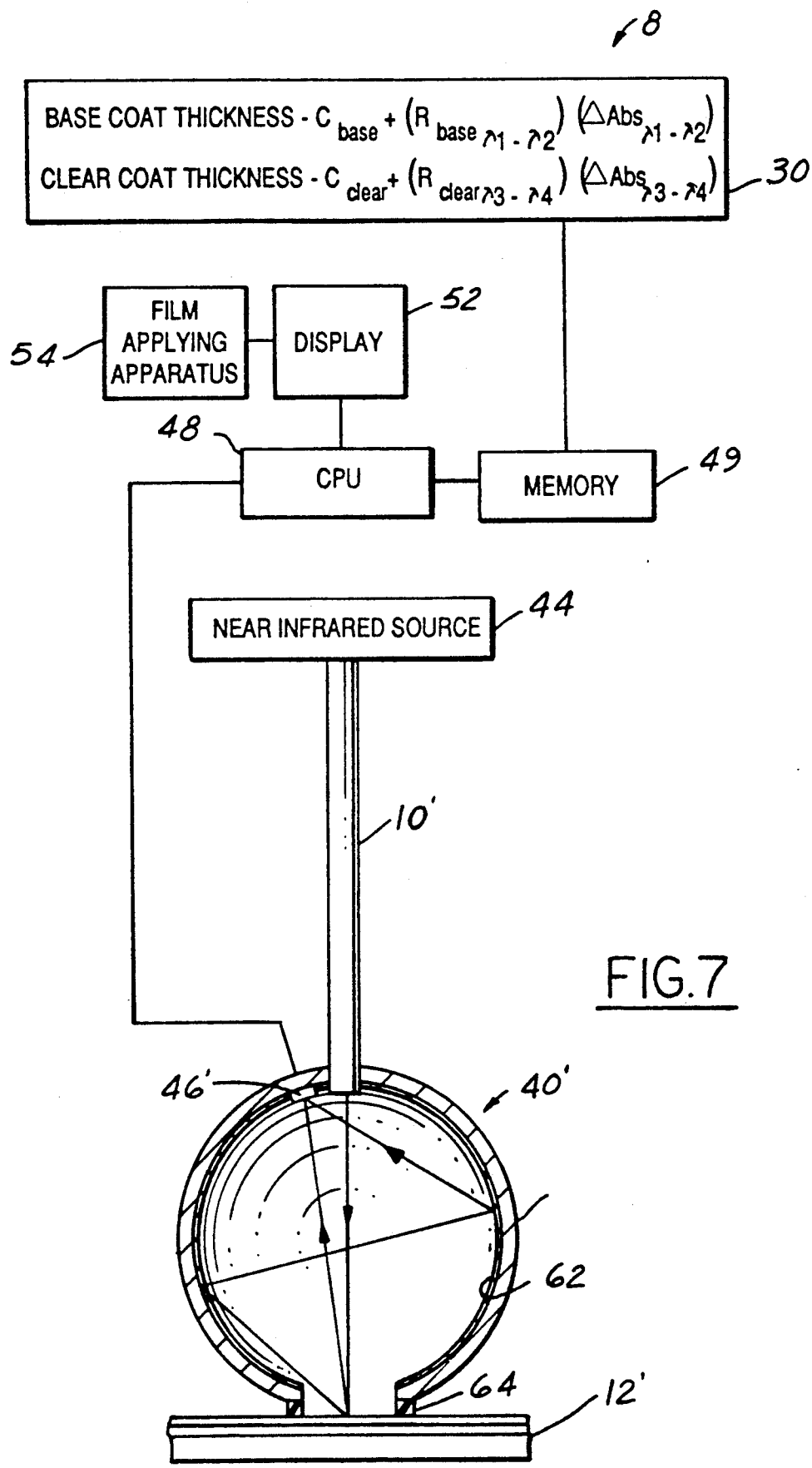
FIG. 7 is a functional schematic of an alternative embodiment of the measuring spectrometer.

An alternative and Preferred embodiment of the measuring spectrometer is shown in FIG. 7. Probe 40' comprises a spherical collector 60. Collector 60 has a polished mirrored interior surface 62 which collects light. Positioned within collector 60 is photo detector 46. Rubber spacer 64 positions collector 60 a fixed distance from the surface of target 12'. A single fiberoptic cable 10' connects collector 60 with NIR source 44. Spherical collector 60 collects a greater amount of reflected light from the target surface than a simple fiberoptic cable and thus permits the use of less sensitive and less costly components for detector 46.

Near Infrared source 44' is a broad band source and monochromator that can be turned to the desired wavelength. Using this arrangement, a single monochromatic source is produced that sequentially emits the desired wavelengths of radiation permitting detector 46' to measure the resulting NIR of each wavelength. The output of detector 46' is supplied to CPU 48. It is believed the embodiment shown in FIG. 7 provides a low cost accurate means for measuring paint thickness for an automotive base coat/clear coat finish.

Measuring spectrometer 8,8' can be programmed with several calibrated linear relationships 30 to enable it to measure different types of paints and different substrates. A selector (not shown) on measuring spectrometer 8,8' can be used to select the appropriate calibration formula and peak and reference wavelengths for the material being measured.

The NIR of the base coat paint has been found to be independent of the paint's color. It was originally anticipated that each color of base coat paint required a unique calibration. However, tests have shown that NIR for modern base coat automotive paints remains relatively independent of the paint's color. Calibration samples 2 may be of a black base coat paint while the target vehicle is white. The metal oxide pigments in the base coat paint do not appear to effect NIR sufficiently to require calibration of the spectrometer 8,8' for each color being measured.

Measuring spectrometer 8,8' can be used independently as a quality control device, or its output can be used to control the painting process. Current automotive assembly techniques make extensive use of automated paint application processes. The output from measuring spectrometer 8,8' can be used to manipulate the paint application apparatus 54. This manipulation can take a variety of forms. For example, if one layer of paint exceeded a predetermined standard, the paint sprayers for that layer could be adjusted to apply less paint. A variety of means exist to those skilled in the art in which the amount of paint being applied to a substrate can be regulated. These means include varying the amount of paint supplied to the sprayer; varying the paint spray pressure; or varying the speed of the paint sprayer movement with respect to the painted substrate.

The integration of the film thickness measurement and the rate of paint application creates an automated process control method for painting a vehicle. The invention is capable of measuring the thickness of a film layer before it has cured or dried. Measuring spectrometer 8,8' can monitor the individual paint thickness applied to a vehicle immediately upon exiting the paint spray booth. The output of measuring spectrometer 8,8' can be used as a feedback to the paint application processes to maintain a close tolerance of paint thickness. Any deviation from a preselected standard thickness is detected and this deviation may be used to manipulate the paint spray apparatus to maintain the desired paint thickness.

It should be understood that the apparatus and processes described herein are but one example of the present invention. Other changes and modifications may be made by one of ordinary skill in the art without departing from the scope and spirit of the present invention, and should be construed as included herein.

We claim:

1. An apparatus for measuring the thickness of two or more film layers on a non-transparent substrate comprising:
    a near infrared radiation source emitting near infrared radiation onto said film layers;
    a near infrared radiation detector, said detector measuring the amount of near infrared radiation reflected from said film layers; and
    means to calculate the thickness of each of said film layers by comparing the measured reflectance to one or more predetermined values.

2. The apparatus of claim 1, further comprising a display means displaying the difference between said measured reflectance and said predetermined values.

3. The apparatus of claim 1 where said calculating means comprises:

memory means containing said predetermined values; and comparator means comparing said measured reflectance to said predetermined values.

4. The apparatus of claim 3 wherein said comparator means is a central processing unit.

5. The apparatus of claim 1 wherein said film layers are a base coat layer and a clear coat layer.

6. An apparatus for measuring the thickness of two or more paint layers on a near infrared reflective substrate comprising:

a near infrared radiation source emitting near infrared radiation onto said Paint layers;

a near infrared radiation detector, said detector measuring the amount of near infrared radiation reflected from said paint layers;

a memory means containing a predetermined equation relating said measured reflectance to paint layer thickness;

means for computing the paint layer thickness using said measured reflectance and said predetermined equation; and means for displaying said computed paint layer thickness.

7. The apparatus of claim 6 wherein said predetermined equation is:

$$\text{Paint layer thickness} = C + \sum_{i=1}^{n} R_i \Delta Abs_i$$

where n = the total number of paint layers i
C = a reflectance constant
$R_i$ = a regression constant for each paint layer i
$\Delta Abs_i$ = the relative absorbance of each paint layer i.

8. The apparatus of claim 7 wherein said computing means is a Central Processing Unit.

9. The apparatus of claim 6, further comprising a spherical collector means receiving light reflected from said paint layers, said collector means containing said detector means therein.

10. The apparatus of claim 9, further comprising a non-marring spacer means attached to said collector, said spacer means, spacing said collector a fixed distance from said paint layers.

11. A method for measuring the thickness of two or more film layers on a rigid substrate comprising:

determining a peak and a reference near infrared reflected absorbance wavelength of each said film layer;

measuring a calibration amount of reflected absorbance at said peak and reference wavelengths for a plurality of calibration samples, said calibration samples having a known thickness of said two or more film layers;

calculating a relationship between said calibration amount and said thickness;

measuring a measured amount of reflected absorbance from said two or more film layers; and computing the thickness of said film layers using said measured amount and said relationship.

12. The method of claim 11, wherein said relationship is linear.

13. The method of claim 12, wherein said relationship is:

$$\text{Film layer thickness} = C + \sum_{i=1}^{n} R_i \Delta Abs_i$$

where n = the total number of film layers i
C = a reflectance constant
$R_i$ = a regression constant for each film layer i
$\Delta Abs_i$ = the relative absorbance of each film layer i.

14. The method of claim 13, wherein said relationship is stored in a memory means.

15. The method of claim 14, wherein a CPU computes said thickness by recalling said relationship from said memory; and substituting said measured amounts into said relationship.

16. The method of claim 11, wherein said film layers are a base coat layer and a clear coat layer.

17. The method of claim 16, wherein said rigid substrate is metal.

18. The method of claim 16, wherein said substrate is plastic.

19. A method of controlling the thickness of two or more film layers applied onto a non-transparent substrate comprising:

emitting near infrared radiation onto said substrate;

measuring a measured amount of reflected near infrared radiation;

comparing a difference between said measured amount and a predetermined amount; and controlling the thickness of each said film layer applied onto said substrate based upon said difference.

20. The method of claim 19, wherein said film layers are a paint.

21. The method of claim 19 wherein said films layers comprise a base coat layer and a clear coat layer.

* * * * *